United States Patent [19]

Ng et al.

[11] Patent Number: 5,374,337
[45] Date of Patent: Dec. 20, 1994

[54] HALOHYDROCARBON RECOVERY PROCESS

[75] Inventors: Mark J. Ng, Pleasant Hill; Bruce T. Maeda, San Jose, both of Calif.

[73] Assignee: Technichem Engineering, Ltd., Emeryville, Calif.

[21] Appl. No.: 110,023

[22] Filed: Aug. 20, 1993

[51] Int. Cl.$^5$ .............................................. B01D 3/38
[52] U.S. Cl. ......................................... 203/41; 34/73; 34/80; 68/18 C; 68/18 F; 203/78; 203/79; 203/DIG. 16; 210/774
[58] Field of Search .................... 68/18 C, 18 F, 18 R; 210/774; 202/170, 200, 202; 203/41, 66, 78–79, 93–94, 96–98, DIG. 16; 34/11, 13, 73, 80, 82

[56] References Cited

U.S. PATENT DOCUMENTS

| | | | |
|---|---|---|---|
| 4,513,590 | 4/1985 | Fine | 210/409 |
| 4,712,392 | 12/1987 | Hagiwara et al. | 202/170 |
| 4,885,099 | 12/1989 | Kelly | 202/170 |
| 4,898,601 | 2/1990 | Casey | 55/341.1 |
| 4,938,845 | 7/1990 | Kohler | 411/508 |
| 5,107,605 | 4/1992 | Yamada | 34/74 |
| 5,139,674 | 8/1992 | Abo | 210/632 |

OTHER PUBLICATIONS

Hazardous Waste Reduction Technology—Research, Development and Demonstration Grant Program, Fiscal Year 1989–1990, State of California Department of Health Services, Toxic Substances Control Program, Alternative Technology Division, Waste Reduction Unit, "Complete Recycling for the Dry Cleaning Industry," p. 17.

Primary Examiner—Virginia Manoharan
Attorney, Agent, or Firm—Townsend and Townsend Khourie and Crew

[57] ABSTRACT

A halohydrocarbon solvent recovery process. The process in one embodiment includes heating a gross mixture including solvent, fatty-acid impurities and water in a bath to vaporize at least a portion of the solvent and the impurities. A portion of the vapor is then condensed in a reflux condenser to form a condensate mixture. After drying and impurity absorption, a solvent product of at least 99% purity may be recovered. In one embodiment, the gross mixture is obtained from steam stripping dry-cleaner filter cartridges.

11 Claims, 2 Drawing Sheets

HALOHYDROCARBON RECOVERY PROCESS

BACKGROUND OF THE INVENTION

The present invention relates to a recycling process for the recovery of organic solvent used, for example, in the dry cleaning industry. More particularly, it relates to a solvent recovery and purification process which enables reuse of contaminated solvent.

Solvents are used in a wide variety of applications. Tetrachloroethylene, or "perchloroethylene" or "perc", as it is commonly named, is known to be effective and is thus widely used as a dry-cleaning solvent. In addition to the use of perc, dry cleaners may employ other halohydrocarbon liquids such as for example trichlorofluoromethane, trichlorofluoroethylene, 1-1-1 trichloroethane or the like to remove a mixture of fatty acids, hydrocarbon-based oils, oil-soluble and insoluble dirt and soil, water and aqueous body moisture, from garments and other fabric products.

In the common dry-cleaning process, soiled garments and other fabrics are loaded for cleaning in hot agitated wash tanks. A volume of organic solvent is continuously recirculated from a contacting zone comprising agitated wash tanks, processed through filter equipment and returned to the wash tanks. One of two filter types are typically employed. The first type of filter uses fabric bags coated with filter aids such as diatomaceous earth, carbon black, surfactants, and the-like, through which the soiled solvent is passed.

The other common filter process employs disposable filter cartridges. Such cartridges typically comprise cellulose and activated carbon which retain a portion of the various contaminants and allowing the return of filtered solvent to the contacting zone. As may be expected, a portion of organic solvent also is adsorbed into the filter media.

During the use of the filters in the typical dry-cleaning process, the flowing fluid pressure drop across the filter is usually monitored and when the pressure drop rises to a critical level, the filter is generally cleaned or replaced. At this point, the dry-cleaners are faced with a significant problem with respect to the replaced, or "spent" solvent filter cartridges.

Unfortunately, the organic solvents used in the dry-cleaning process, being chlorinated hydrocarbons, have serious disposal problems associated with their use. Moreover, the solvents retained in the filter media are classified as Hazardous Waste under the Resource Conservation and Recovery Act, a federal environmental statute. Therefore, the filter cartridges comprising perchloroethylene and other contaminants may not lawfully be disposed of in common landfills and the like.

Previous workers have attempted to modify dry-cleaning equipment to include solvent recovery processes. In an attempt to solve the continuing problem of contaminated filter cartridges, others have suggested a continuous steam distillation unit as part of the dry-cleaner's equipment.

Another approach to the problem of spent filter cartridges, where filters are employed at the dry-cleaner site, involves collection of the solvent contaminated filter cartridges from the cleaners, and transporting the collected cartridges to a treatment site. A partial solvent extraction is performed, followed by destruction of the cartridge usually by grinding the entire cartridge. However, even when such solvent removal is attempted prior to grinding the filter cartridge, enough solvent typically remains in the filter media at a concentration prohibiting recycle of the filter media for other more valuable uses.

Another major problem with respect to recycling of halohydrocarbon solvents in the dry cleaning industry involves the accumulation of dissolved compounds in the solvent itself. Contaminants such as for example fatty-acids and lipids are found in the perchloroethylene solvent following its use in dry-cleaning. High odor level is therefore often associated with used perchloroethylene solvent. This is especially true for that partially extracted as explained above. High odor level, combined with high contaminant levels, prohibits the reuse or resale of this perchloroethylene solvent mixture to the dry-cleaning industry.

Used solvent mixtures containing such contaminants not being resalable, are relegated to lower level uses, such as industrial cleaning solvents. Unfortunately, use as an industrial cleaning solvent does not remove or reduce the quantity potentially environmentally harmful compounds from the industrial waste stream. Moreover, since the mixtures were not recyclable prior to the present invention, additional virgin perchloroethylene was required to be manufactured for use in the dry-cleaning operations of interest.

It is apparent that a process for recovery of solvents, which process provides for effective recycling of the solvent, is much desired in the industry.

SUMMARY OF THE INVENTION

In accordance with the present invention, a process is presented for the recovery and reuse of halohydrocarbons such as perchloroethylene. In one preferred embodiment, the process comprises heating a gross mixture comprising halohydrocarbon, fatty-acid impurities, and water in a bath to vaporize at least a portion of the halohydrocarbon and associated fatty-acid impurities; condensing at least a portion of the vapor in a condenser to form a condensate mixture also containing the fatty-acid impurities; drying a portion of the condensate mixture in a dryer; adsorbing a majority of the impurities contained in the condensate mixture in a adsorber; and, recovering halohydrocarbon product of at least 99% purity.

In the preferred embodiment the gross halohydrocarbon mixture comprises perchloroethylene derived from a dry-cleaning filter steam-stripping unit, as described below. Preferably, the dry-cleaning filter cartridge stripping unit comprises a process arrangement for contacting at least one dry-cleaning filter cartridge with steam to vaporize at least a portion of perchloroethylene contained in the filter cartridge; condensing and recovering a gross mixture of perchloroethylene and water from the stripping unit for feed to the heated bath of the above process.

The steam stripping unit preferably utilizes saturated steam and may comprise a plurality of pressure vessels operated in series, each vessel preferably accommodating a plurality of contaminated filter cartridges.

As further described in detail below, the process of the present invention, carried out in accordance with our disclosure, enables the recovery of ultra-pure halohydrocarbon solvents such as perchloroethylene from contaminated solvent mixtures which, prior to the present invention, were processed to produce only a cleaning solvent waste product.

DESCRIPTION OF THE PREFERRED EMBODIMENT

In accordance with the present invention, a process for the recovery of halohydrocarbon solvents, preferably perchloroethylene, from a gross mixture comprising halohydrocarbon solvent, fatty-acid impurities and water comprises the steps of heating a gross mixture comprising halohydrocarbon, fatty-acid impurities and water in a bath to vaporize at least a portion of said halohydrocarbon solvent and a portion of said impurities; condensing at least a portion of said vapor in a reflux condenser to form a condensate mixture; drying a portion of said condensate in a dryer; adsorbing a majority of said impurities contained in said condensate mixture in an adsorber; and recovering an ultra-pure halohydrocarbon product.

The term "fatty-acid impurities" generally refers to any of numerous saturated aliphatic monocarboxylic acids that are deposited in soiled garments and fabrics, and may occur naturally in the form of glycerides in fats and fatty oils. The term fatty-acid impurities as used herein also may refer to lipids which characteristically contain fatty-acids as components, for example, acylglycerols, phosphoglycerides and sphingolipids.

The term "ultra-pure" means at least ninety-nine percent purity by weight, preferably at least 99.5 per cent, and having a concentration of fatty-acid and other impurities of less than about one percent by weight.

The term "adsorb" means to contact with an adsorbent. An "adsorbent" is a material that has the ability to take up and hold a compound or molecule to be adsorbed by adhesion in a thin layer on the surface or in the interstices of the adsorbing material.

Figure 1:
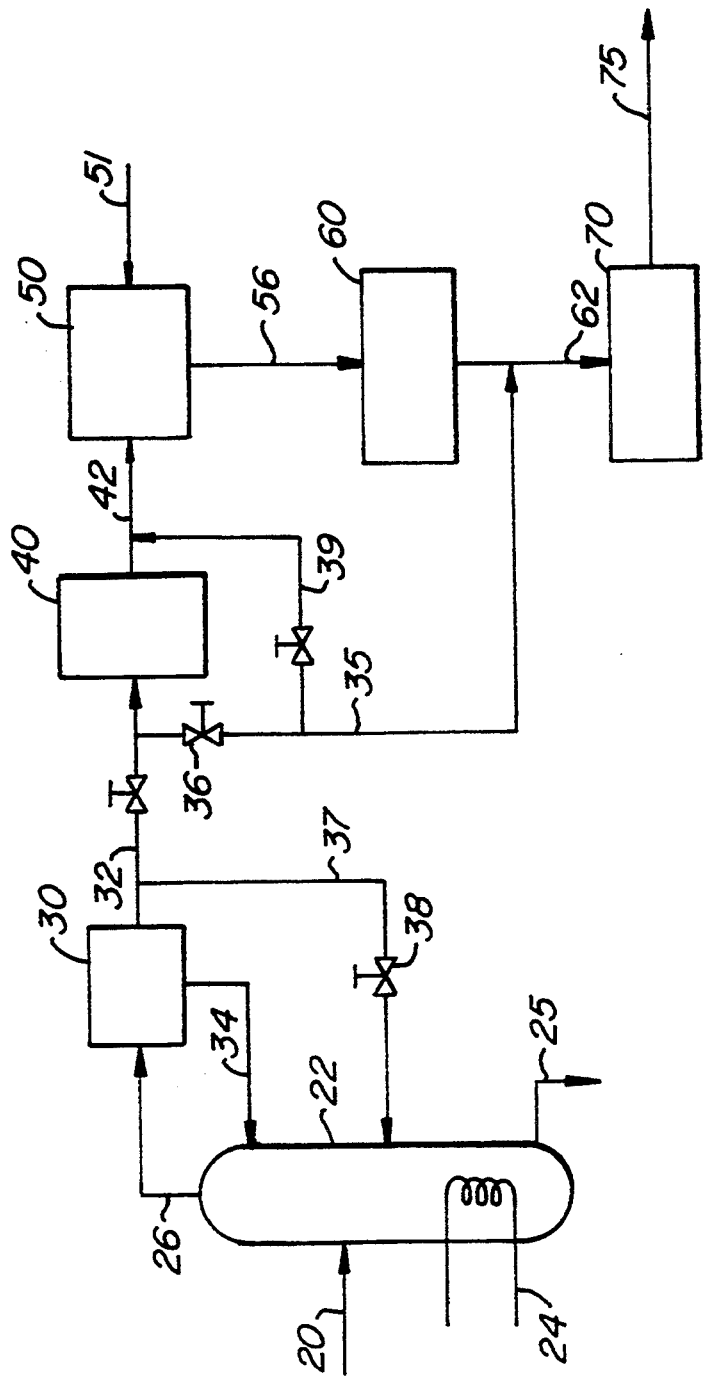
FIG. 1 is a process flow diagram for the dry-cleaning solvent recovery and purification process embodiment.

Referring now to FIG. 1, a gross mixture comprising organic halohydrocarbon solvents such as for example, tetrachloroethylene, trichlorofluoromethane, or trichlorofluoroethylene; fatty-acid impurities and water and other contaminants is introduced to a heated bath 22 through feed stream 20. Preferably heated bath 22 further comprises a fractionation section, and is preferably a packed-type contactor. We have determined for best results in separation of the gross halohydrocarbon mixture, at least seven theoretical stages are required, depending on the level of impurities known or suspected to be present. Heat source 24 in heated bath 22 causes vaporization of the more volatile organic compounds in the mixture to flow through overhead flow-stream 26 to condenser 30. Condenser 30 may be air-cooled, water-cooled or heat exchanged causing condensation of the volatilized organics. Heat flux to the heated bath preferably remains constant to provide a substantially constant vapor boil-up. Monitoring of the condensing temperature and returning a variable amount of condensate to the fractionator provides for a relatively consistent purity of halohydrocarbon in stream 32 from the condensate splitter. Accordingly, a portion of the condensate may be selectively returned to the heated bath 22 through condensate return line 34. The remainder condensate flows from condenser 30 through line 32 to dryer 40.

Dried condensate thereafter flows to a contactor 50 wherein purification of the solvent containing impurities takes place. In accordance with our present invention, contaminated solvent stream entering adsorber 50 through feed line 42 is contacted with a quantity of adsorbents indicated in FIG. 1 by line 51.

A stream containing purified organic solvents, in the preferred embodiment comprising purified perchloroethylene, flows from the adsorber in line 56 to a filter unit 60. Adsorbent particulates containing fatty-acid impurities adsorbed thereon are separated in the filter unity wherefrom purified solvent stream 62 optionally flows to dryer 70 and to ultra-pure solvent storage via stream 75. By "dryer" we mean a mechanical means for reducing water content of a liquid stream.

We have found that fatty acids and other contaminants are not capable of separation in the fractionator, and remain in the solvent. The highly odoriferous nature of the fatty acids renders the solvent unusable for any significant purpose, other than for example as an industrial cleaning solvent. For the recycle of halohydrocarbon solvents so contaminated, further process steps in accordance with the present invention are required.

The dried condensate is thereafter contacted with an adsorbent, preferably finely crushed silica gel. The contactor is preferably a mixer, such as for example a stirred tank, but may be in any type of contactor or containment vessel. The silica gels useful in the present invention include calcium silicate and magnesium silicate. Following contacting with an adsorbent, at least a portion, preferably the major amount of fatty-acid impurities contained in the solvent are retained on the silica gel adsorbent.

The volume of gross mixture volatilized in heated bath 22 is preferably monitored, along with temperature of the heated bath. Condensate recycle line 37 and adsorber bypass line 35 function to carry out steps of preferred embodiments of the present invention.

Among other factors, we have found the selective drying and adsorbing at various stages in a batch process (characterized in terms of percentage of original feed volume in heated bath 22 vaporized) is particularly effective in impurity removal. It should be noted the process is not limited to a batch design, but may also be a continuous process. For a volatilized percent in the range of between 0 and about 20%, preferably 0 and about 10%, the entire stream 32 is directed through dryer 40 and adsorber 50. For this initial fraction, in adsorber 50 a relatively high dosage of adsorbent, preferably silica gel is administered. Further, in the 0 to about 20% boiling fraction, drying agents in dryer 40 include an amount of "drierite." Drierite is substantially calcium silicate. In accordance with the present invention, we have found the combination of high dosage of adsorbent with magnesium silicate and drierite in dryer is most effective to remove the predominance of fatty acid impurities in this boiling range.

In the boiling fraction from about 20% to about 90%, preferably from about 10% to about 85%, the above flow scheme, that is subjecting the entire condensate stream 32 through dryer 40 and adsorber 50 to produce a purified solvent product is followed. For this boiling fraction, however, a relatively low dosage of silica gel is administered in adsorber 50. The dosage is preferably between about 0.05 gram and about 1.5 gram per 100 gram of treated solvent.

The third fraction is characterized as boiling after the first and second fraction and after about 80%, preferably after about 90% of the total original gross mixture has been volatilized in the heated bath. We have discovered this fraction contains an extremely high concentration of interfering hydrocarbon compounds. Hydrocarbon compounds such as, are not readily separable and thus contaminate product solvent stream 75. Accordingly, this fraction is recycled from condenser 30 to heated bath 22 through line 37 to be processed with a subsequent batch of gross mixture.

The overall combination of-the above process steps enables the recovery and purification of a gross mixture comprising halohydrocarbon solvents, water and contaminating fatty-acid impurities. In accordance with the present invention, a process comprising the above steps is preferred in the production of ultra-pure solvents such as perchloroethylene which may be resold to the dry cleaning industry for reuse.

Figure 2:
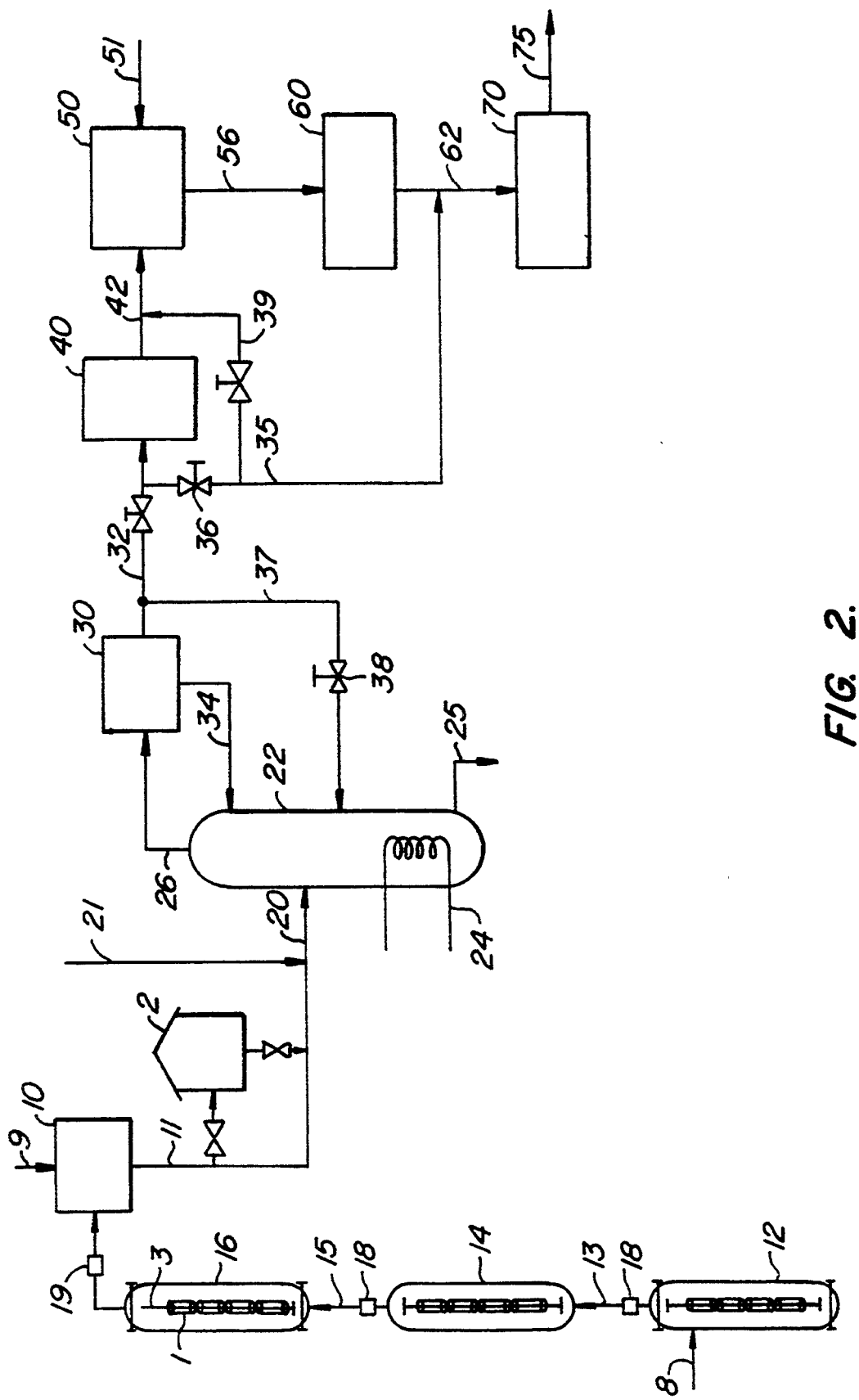
FIG. 2 is a process flow diagram depicting the steam stripping unit and solvent recovery and purification process.

Referring now to FIG. 2, further embodiments of the present invention are described. In one alternative embodiment, filter cartridges are placed within a pressure vessel and subjected to steam to volatilize at least a portion of organic solvent from the filter media. Preferably, a plurality of pressure vessels 12, 14 and 16 are fluidly connected in series as depicted in FIG. 2. In this embodiment, a plurality of filter cartridges 1 are disposed around a flow line 3 within the pressure vessels. Steam from an outside steam source (not shown) is provided to one of the pressure vessels. Preferably, the steam is saturated at a pressure of between about 20 psig and about 80 psig for use in the first of the plurality of pressure vessels. The steam is contacted with the filter cartridge media, preferably flowing from outside to the inside of the cylindrically shaped cartridge, volatilizing away from the cartridge a portion of the organic solvents contained therein.

Steam and organic vapors flow through line 13, in the preferred embodiment, preferably through bucket-type traps 18 to another of the pressure vessels 14. The pressure of downstream vessels will be less than the pressure of upstream vessels. In this embodiment, filter cartridges are steam stripped in the downstream pressure vessels with volatilized organic compounds and water flowing from the last of the pressure vessels to condenser 10. Condenser 10 may be air-cooled or water-cooled with external cooling medium through line 9, and substantially condenses any remaining vapor.

A gross mixture of organic solvent compounds, water and contaminating fatty acid impurities flow from condenser 10 through line 11. Optionally, storage tank 2 holds the accumulated condensate from line 11. The gross condensate mixture derived from the above described steam stripping operation may comprise a portion of the gross mixture which flows to heated bath 22 through line 20. Alternatively, or in combination, drycleaner "sludge" may be combined through line 21 with the gross condensate mixture. The "sludge" may comprise hydrocarbon-based detergents, dirt, solvent, water and numerous articles from hangers to buttons and garment pieces. It is preferable to store the sludge in a separate vessel, from which it may be selectively added to the gross mixture in heated bath 22. The process then proceeds as described in connection with FIG. 1.

Thereafter, separation of the liquid perchloroethylene from the adsorbent results in a separated perchloroethylene product of at least 99 percent, preferably at least 99.5 percent purity.

In an alternate embodiment, the gross perchloroethylene mixture to be heated in the heated bath is derived from a dry-cleaning filter steam-stripping unit. Such a filter stripping unit is shown in FIG. 2. Preferably, the dry-cleaning filter cartridge stripping unit comprises a process arrangement for contacting a plurality of dry-cleaning filter cartridges with steam to vaporize at least a portion of perchloroethylene contained in said dry-cleaning filter cartridge; condensing and recovering a gross mixture of perchloroethylene and water from said stripping unit for feed to the heated bath.

The steam stripping unit preferably utilizes saturated steam in the range of between about 50 and about 90 psig at the stripping unit inlet, and may comprise a plurality of pressure vessels operated in series, each vessel containing a plurality of contaminated filter cartridges. When multiple pressure vessels are employed in the stripping process, it is preferable to cascade the steam in a serial manner, from the first pressure vessels. Steam traps, preferably bucket-type traps, may be located in flow lines between such plurality of pressure vessels. To maximize the stripping of steam from the cartridges, we have found it preferable to flow steam from the outside region to the inside of the filter cartridge. Accordingly, in a preferred embodiment, the cartridges are placed in the vessels about a steam injection flowline, with steam flow directed from the flowline through the cartridges to the outside of the cartridge. A pressure gradient is thereby present to direct the flow of volatilized solvent vapors away from the interior of the cartridges.

In the preferred embodiment depicted in FIG. 2, many pumps, valves and the like operate to direct flow and monitor contents of the depicted streams. Because such pumps, valves and monitoring devices are known in the processing art, they are, for the most part, not shown here for clarity sake.

The invention having now been described with reference to specific embodiments, other embodiments will be apparent to those of ordinary skill in the art. For example, the shape of the stripping vessels may vary. Alternatively, the order in which the process steps are carried out may vary, and may also vary in time. Also, methanol may be injected in the stream stripping unit to enhance the solvent separation process. For example, the gross mixture may be accumulated in a tank or the like from the stripping of a large number of filter cartridges in accordance with the present invention, and thereafter a series of purification batches may be processed in accordance with the solvent recovery process of the present invention. It is therefore not intended that this invention be limited, except as indicated in the appended claims, along with the full scope of equivalents to which the claims are entitled.

What is claimed is:

1. A solvent recovery process for purification of a solvent comprising halohydrocarbons comprising the steps of:

heating a gross mixture comprising halohydrocarbons, fatty-acid impurities and water in a bath to vaporize at least a portion of said halohydrocarbons and said impurities;

condensing at least a portion of said vapor in a reflux condenser to form a condensate mixture;

drying a portion of said condensate in a dryer;

adsorbing a majority of said impurities contained in said dried portion of said condensate mixture in an adsorber;

returning a portion of said condensate mixture to said bath; and recovering halohydrocarbon solvent product of at least 99% purity.

2. The process as recited in claim 1 wherein said adsorbing step is carried out when said gross mixture bath is at a temperature of between about 230 and about 280 degrees fahrenheit, and discontinued when said gross mixture bath is above about 280 degrees fahrenheit.

3. The process as recited in claim 1 wherein said gross halohydrocarbon solvent mixture comprises perchloroethylene.

4. The process as recited in claim 3 wherein said returned portion to said recovered amount of said perchloroethylene solvent product ratio is between about 0.8 and about 10.0.

5. The process as recited in claim 3 wherein said gross perchloroethylene mixture is derived from dry-cleaning filter stripping.

6. A solvent recovery process for purification of a solvent comprising halohydrocarbons, comprising the steps of:

contacting at least one dry-cleaning filter cartridge with steam in a steam stripping unit to vaporize at least a portion of perchloroethylene contained in said dry-cleaning filter cartridge;

condensing and recovering a gross mixture comprising halohydrocarbons, fatty-acid impurities and water from said stripping unit;

heating said gross mixture in a bath to vaporize at least a portion of said halohydrocarbons and said impurities;

condensing at least a portion of said vapor in a reflux condenser to form a condensate mixture;

drying a portion of said condensate in a dryer;

adsorbing a majority of said impurities contained in said dried portion of said condensate mixture in an adsorber;

returning a portion of said condensate mixture to said bath; and recovering halohydrocarbon solvent product of at least 99% purity.

7. The process as recited in claim 6 wherein said at least one dry-cleaning filter cartridge comprises a plurality of cartridges positioned within said steam stripping unit, said steam stripping unit comprising a plurality of pressure vessels operating in serial fluid flow communication.

8. The process as recited in claim 6 wherein said contacting of steam comprises flowing steam in the direction from the interior of said cartridge to the exterior of said cartridge.

9. The process as recited in claim 7 wherein said steam in the first of said plurality of pressure vessels is saturated steam at a pressure of greater than about 50 psi.

10. The process as recited in claim 7 wherein said steam in the first of said plurality of pressure vessels is saturated steam at a pressure of between about 60 and about 90 psi.

11. The process as recited in claim 6 wherein methanol is further combined with said steam contacting said dry cleaning filter cartridge.

* * * * *